(12) United States Patent
Tanaka et al.

(10) Patent No.: US 12,392,669 B2
(45) Date of Patent: Aug. 19, 2025

(54) TEMPERATURE SENSOR AND WIRE HARNESS

(71) Applicant: YAZAKI CORPORATION, Tokyo (JP)

(72) Inventors: Hiraku Tanaka, Makinohara (JP); Tomohiro Matsushima, Makinohara (JP); Kenta Tanaka, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 404 days.

(21) Appl. No.: 18/300,402

(22) Filed: Apr. 14, 2023

(65) Prior Publication Data

US 2023/0341270 A1    Oct. 26, 2023

(30) Foreign Application Priority Data

Apr. 21, 2022  (JP) .................... 2022-069862

(51) Int. Cl.
| | |
|---|---|
| *G01K 1/14* | (2021.01) |
| *B60R 16/02* | (2006.01) |
| *G01K 1/08* | (2021.01) |
| *G01K 13/02* | (2021.01) |
| *H01R 13/502* | (2006.01) |

(52) U.S. Cl.
CPC ............ *G01K 1/14* (2013.01); *B60R 16/0215* (2013.01); *G01K 1/08* (2013.01); *G01K 13/02* (2013.01); *H01R 13/502* (2013.01)

(58) Field of Classification Search
CPC ............ G01K 1/14; G01K 1/08; G01K 13/02; G01K 13/024; G01K 7/22; G01K 2205/00; B60R 16/0215; H01R 13/502; H01R 13/40; H01B 7/00

USPC ......................................................... 374/208
See application file for complete search history.

(56) References Cited

U.S. PATENT DOCUMENTS

| | | | |
|---|---|---|---|
| 2004/0264544 A1* | 12/2004 | Fischer ................... | G01K 7/16 374/E7.018 |
| 2005/0155442 A1* | 7/2005 | Grundmann ......... | G01D 11/245 73/866.5 |

(Continued)

FOREIGN PATENT DOCUMENTS

JP          2010-281787 A     12/2010

*Primary Examiner* — Peter J Macchiarolo
*Assistant Examiner* — Janice M Soto
(74) *Attorney, Agent, or Firm* — KENEALY VAIDYA LLP (57) ABSTRACT

A temperature sensor applied to a wire harness includes a temperature-sensitive element, a main body part that holds the temperature-sensitive element, a clamp part, and a connector. The main body part includes a holding part that holds the temperature-sensitive element on the tip side in an insertion direction and is positioned inside the clamp part by being inserted into the clamp part along that direction. The clamp part includes a pair of window parts that allow the temperature-sensitive element to be exposed to outside of the clamp part. Furthermore, the holding part includes a pair of protection wall parts positioned by sandwiching a window part in a state of being inserted into the clamp part. An end part of the wall part on a tip side in the insertion direction is positioned by protruding more than an end part of the temperature-sensitive element on the tip side does.

2 Claims, 6 Drawing Sheets

(56) References Cited

U.S. PATENT DOCUMENTS

2011/0211614 A1\* 9/2011 Gmelin .................. G01K 1/14
                                                        374/208
2012/0031517 A1   2/2012 Yoshida et al.

\* cited by examiner

TEMPERATURE SENSOR AND WIRE HARNESS

CROSS-REFERENCE TO RELATED APPLICATION(S)

The present application claims priority to and incorporates by reference the entire contents of Japanese Patent Application No. 2022-069862 filed in Japan on Apr. 21, 2022.

BACKGROUND OF THE INVENTION

1. Field of the Invention

The present invention relates to a temperature sensor and a wire harness.

2. Description of the Related Art

For example, Japanese Patent Application Laid-open No. 2010-281787A discloses a temperature sensor with simplified fixing function, which is configured with a mounting clamp inserted and fixed through a through-hole of a mounting target, and a thermistor element embedded near a tip inside the mounting clamp. The temperature sensor with simplified fixing function is formed compact and can be easily attached to a mounting target by integrally molding the thermistor element, terminals, and lead wires or the like connected to the terminals embedded in the clamp.

Such a temperature sensor with simplified fixing function described above may have each part separately molded considering versatility such as mountability and maintainability after mounting. In such a case, a temperature-sensitive element such as a thermistor element needs to be mounted to the clamp, and it is desired to have a configuration capable of properly protecting the temperature-sensitive element until the temperature-sensitive element is mounted to the clamp.

SUMMARY OF THE INVENTION

The present invention is designed in view of the aforementioned circumstances, and an object thereof is to provide a temperature sensor and a wire harness capable of properly protecting a temperature-sensitive element.

In order to achieve the above mentioned object, a temperature sensor according to one aspect of the present invention includes a temperature-sensitive element that detects a temperature of a measurement target; a main body part that holds the temperature-sensitive element; a clamp part that is capable of being attached to and detached from a fixing target area along a first direction and capable of fixing the main body part to the fixing target area in a state of being mounted to the fixing target area; and a connector that is provided at an end part of a wiring material exhibiting conductivity and allows, in a state of being fitted to the main body part, the temperature-sensitive element and the wiring material to be electrically connected, wherein the main body part includes: a holding part that extends along an insertion direction aligned with the first direction, the holding part holding the temperature-sensitive element on a tip side in the insertion direction and being positioned inside the clamp part by being inserted inside the clamp part along the insertion direction; and a connector part to which the connector is capable of being fitted in a state of being fixed to the fixing target area via the clamp part, the clamp part includes, in a state of being mounted to the fixing target area, a pair of window parts for exposing the temperature-sensitive element held by the holding part to outside of the clamp part, the pair of window parts being provided at end parts positioned inside the fixing target area and being formed along a direction intersecting with the first direction, the holding part includes a pair of protection wall parts positioned by sandwiching the window parts in a state of being inserted inside the clamp part, and an end part of the protection wall part on a tip side in the insertion direction is positioned by protruding more to the tip side than an end part of the temperature-sensitive element on the tip side does.

In order to achieve the above mentioned object, a wire harness according to another aspect of the present invention includes a wiring material exhibiting conductivity; and a temperature sensor that includes: a temperature-sensitive element that detects a temperature of a measurement target; a main body part that holds the temperature-sensitive element; a clamp part that is capable of being attached to and detached from a fixing target area along a first direction and capable of fixing the main body part to the fixing target area in a state of being mounted to the fixing target area; and a connector that is provided at an end part of a wiring material exhibiting conductivity and allows, in a state of being fitted to the main body part, the temperature-sensitive element and the wiring material to be electrically connected, wherein the main body part includes: a holding part that extends along an insertion direction aligned with the first direction, the holding part holding the temperature-sensitive element on a tip side in the insertion direction and being positioned inside the clamp part by being inserted inside the clamp part along the insertion direction; and a connector part to which the connector is capable of being fitted in a state of being fixed to the fixing target area via the clamp part, the clamp part includes, in a state of being mounted to the fixing target area, a pair of window parts for exposing the temperature-sensitive element held by the holding part to outside of the clamp part, the pair of window parts being provided at end parts positioned inside the fixing target area and being formed along a direction intersecting with the first direction, the holding part includes a pair of protection wall parts positioned by sandwiching the window parts in a state of being inserted inside the clamp part, and an end part of the protection wall part on a tip side in the insertion direction is positioned by protruding more to the tip side than an end part of the temperature-sensitive element on the tip side does.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, an embodiment according to the present invention will be described in detail with reference to the accompanying drawings. Note, however, that the present invention is not limited by the embodiment. Furthermore, structural components in the following embodiment include those that can be easily replaced by those skilled in the art, or those that are substantially the same.

First Embodiment

Figure 1:
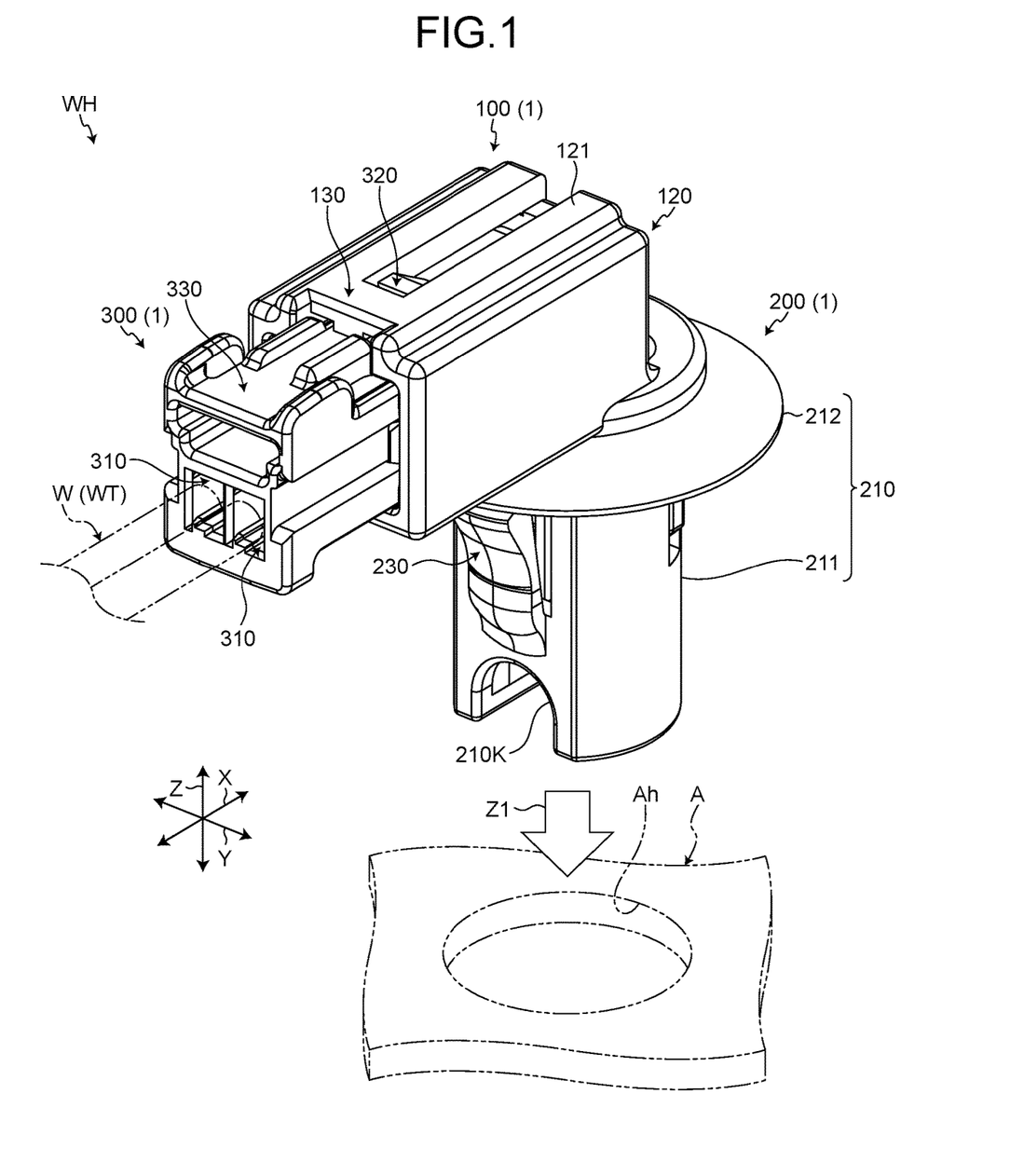
FIG. 1 is a perspective view illustrating a schematic configuration of a wire harness including a temperature sensor according to an embodiment.
Figure 2:
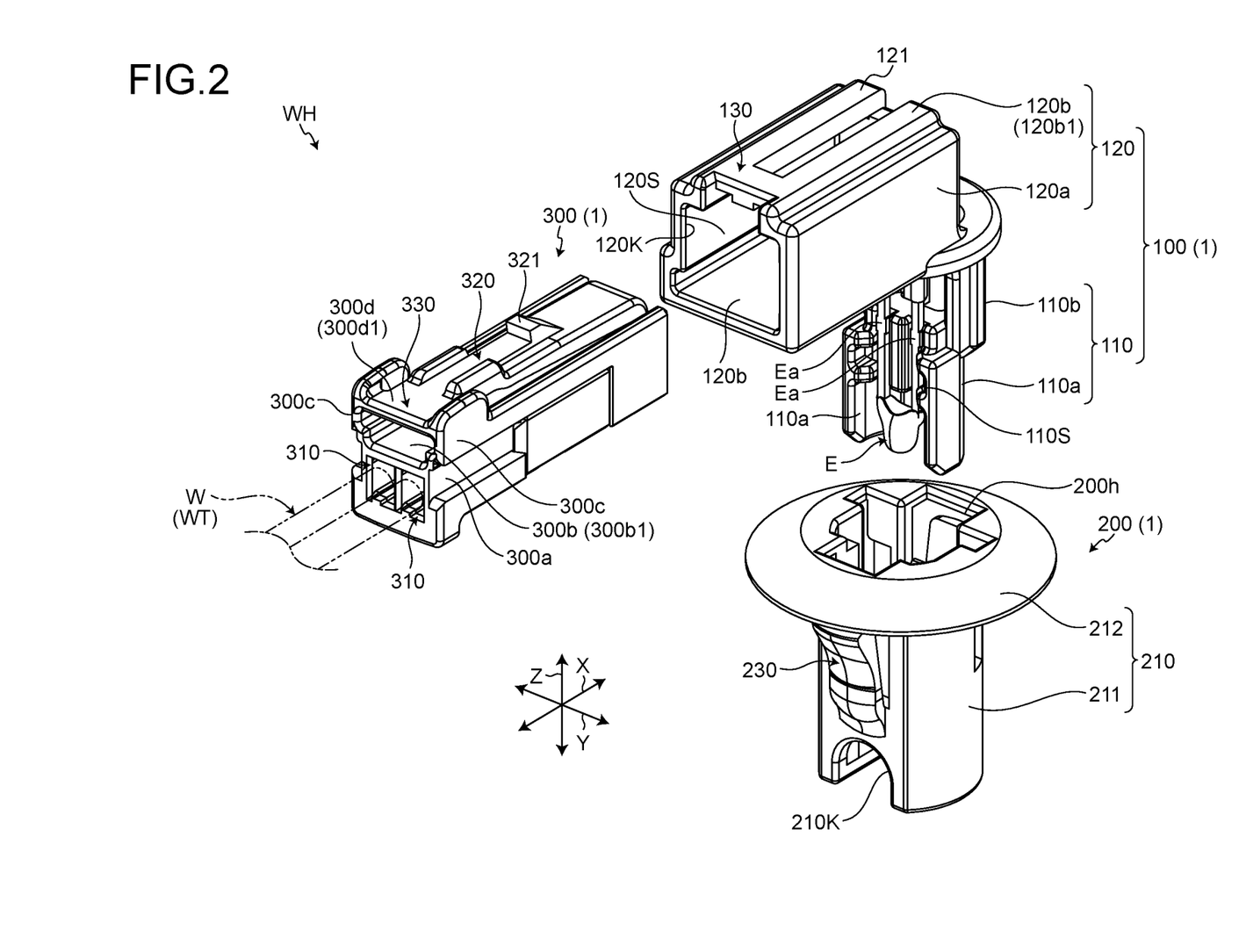
FIG. 2 is an exploded perspective view illustrating a schematic configuration of the wire harness including the temperature sensor according to the embodiment.

A wire harness WH illustrated in FIG. 1 and FIG. 2 is a bundle of a plurality of wiring materials W used for power supply and signal communication formed into an assembly component so as to connect the wiring materials W to each device via a connector and the like for connecting each of the devices loaded on a vehicle, for example.

The wire harness WH includes: a wiring material WT with terminal, which includes the wiring material W exhibiting conductivity and a terminal T provided at an end part of the wiring material W; and a temperature sensor 1 connected to the wiring material WT with terminal. In addition, the wire harness WH may further include various structural components such as a corrugated tube, a grommet, an electrical junction box, a connector, and the like.

The wiring material W is, for example, an insulated electric wire with the core wire, which is a bundle of a plurality of conductive metal element wires, covered with an insulation coating part. The wiring material W may also be a bundle of a plurality of insulated electric wires. Note that the wiring material W may be an insulated metal rod, which is a conductive metal rod covered with an insulation coating part.

The terminal T (see FIG. 6) is, for example, a crimp terminal that is configured with a conductive metallic material and crimped to the terminal of the wiring material W. For example, the terminal T is formed into a prescribed shape by performing pressing such as bending and cutting on a metal plate that is a base material. The terminal T provided at an end part of the wiring material W is housed and held in a connector 300 to be described later.

The temperature sensor 1 includes a main body part 100, a clamp part 200, and the connector 300. The temperature sensor 1 can electrically connect a temperature-sensitive element E and the wiring material W by fitting the connector 300 that holds the terminal T of the wiring material WT with terminal to the main body part 100 that holds the temperature-sensitive element E that detects the temperature of a measurement target. The temperature sensor 1 is, for example, applied to an air duct used for a battery pack or the like. For example, battery packs loaded on electric vehicles and hybrid vehicles generate heat through electrochemical reactions, and the higher the temperature, the lower the power generation efficiency. Therefore, the air duct needs to blow cooling air as necessary to cool the battery pack, and the temperature sensor 1 is used as a member that is fixed to a fixing target area A provided on the intake side of the air duct for detecting the air temperature inside the air duct to control the airflow.

Furthermore, the temperature sensor 1 according to the present embodiment has the main body part 100 and the clamp part 200 molded separately and, for example, has a structure for protecting the temperature-sensitive element E when the main body part 100 is attached to the clamp part 200 along an insertion direction that is aligned with a fixing direction (corresponding to a first direction) to the fixing target area A. As such a structure, the temperature sensor 1 implements a configuration capable of properly protecting the temperature-sensitive element E until the temperature-sensitive element E is mounted to the clamp part 200, by applying a pair of wall parts 110*a* (corresponding to protection wall parts) to the main body part 100. Hereinafter, configurations of each of the main body part 100, the clamp part 200, and the connector 300 configuring the temperature sensor 1 will be described in detail by referring to FIG. 1 to FIG. 6.

Note that XY direction in FIG. 1 to FIG. 6 typically corresponds an extending direction and the like of the fixing target area A, X direction corresponds to a depth direction of the fixing target area A, and Y direction corresponds to a width direction and the like of the fixing target area A. Furthermore, Z direction corresponds to a height direction (thickness direction) and the like of the fixing target area A. Unless otherwise noted, each of the directions used in the following description is described as the direction in a state where the temperature sensor 1 is being mounted to the fixing target area A via the clamp part 200, and the X direction is referred to as the depth direction X, the Y direction as the width direction Y, and the Z direction as the height direction Z.

Furthermore, the tip side in the depth direction X corresponds to the side where the connector 300 is positioned relative to the main body part 100, for example, and the base end side in the depth direction X corresponds to the side where the clamp part 200 is positioned relative to the main body part 100, for example. In addition, the upper side in the height direction Z corresponds to the side where the connector 300 is positioned relative to the fixing target area A (outer side of the duct that is the fixing target area A), for example, and the lower side in the height direction Z corresponds to the side where the clamp part 200 is positioned relative to the fixing target area A (inner side of the duct), for example.

In the following description, a first direction is the direction in which the clamp part 200 is inserted into an insertion hole Ah of the fixing target area A when fixing the temperature sensor 1 to the fixing target area A, and it corresponds to the direction from the upper side toward the lower side in the height direction Z. Furthermore, the insertion direction aligned with the first direction described above is the direction in which the main body part 100 is inserted into an insertion hole 200*h* of the clamp part 200 and, like the first direction, it corresponds to the direction from the upper side toward the lower side in the height direction Z. Furthermore, the direction in which the connector 300 is fitted to the main body part 100 in a state where the main body part 100 is being fixed to the fixing target area A is described as a direction that is aligned with the depth direction X, that is, a direction orthogonal to the height direction Z. Thus, for convenience of explanation, the direction in which the clamp part 200 is inserted into the insertion hole Ah of the fixing target area A and the direction in which the main body part 100 is inserted into the insertion hole 200*h* of the clamp part 200 are referred to as insertion direction Z1, and the direction in which the connector 300 is fitted to the main body part 100 is referred to as fitting direction X1 (see FIG. 5 and FIG. 6).

Figure 6:
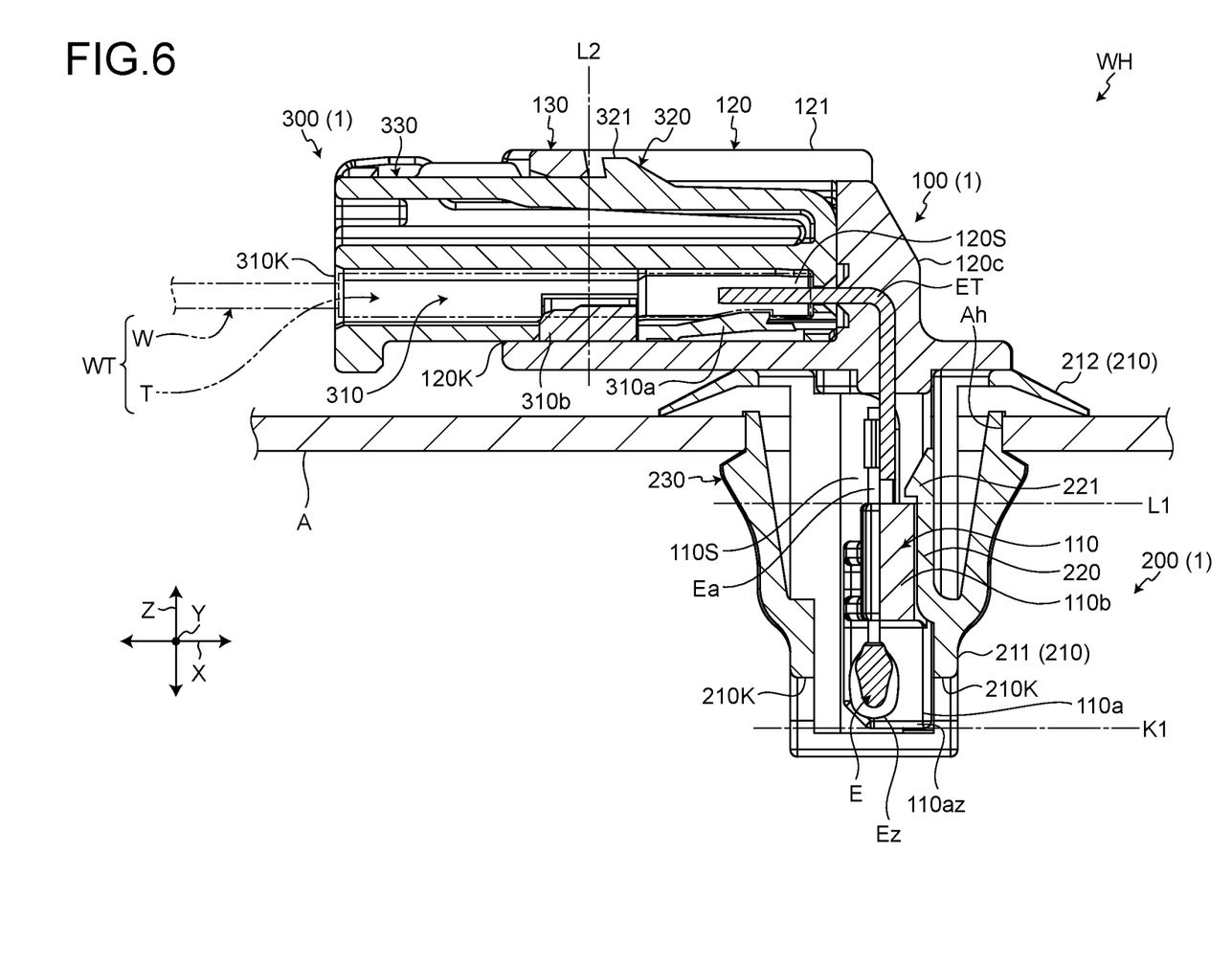
FIG. 6 is a sectional side view taken along a fitting direction of the wire harness including the temperature sensor according to the first embodiment.

As illustrated in FIG. 2 and FIG. 6, the main body part 100 is configured including a holding part 110 and a connector part 120, and each of those parts is integrally formed with an insulating resin material.

The holding part 110 is a part that extends along the insertion direction Z1 and capable of holding the temperature-sensitive element E on the tip side in the insertion direction Z1. The holding part 110 is inserted into the clamp part 200 along the insertion direction Z1 to be positioned inside the clamp part 200, and it is positioned on the inner side of the fixing target area A in a state of being fixed to the fixing target area A via the clamp part 200.

Figure 3:
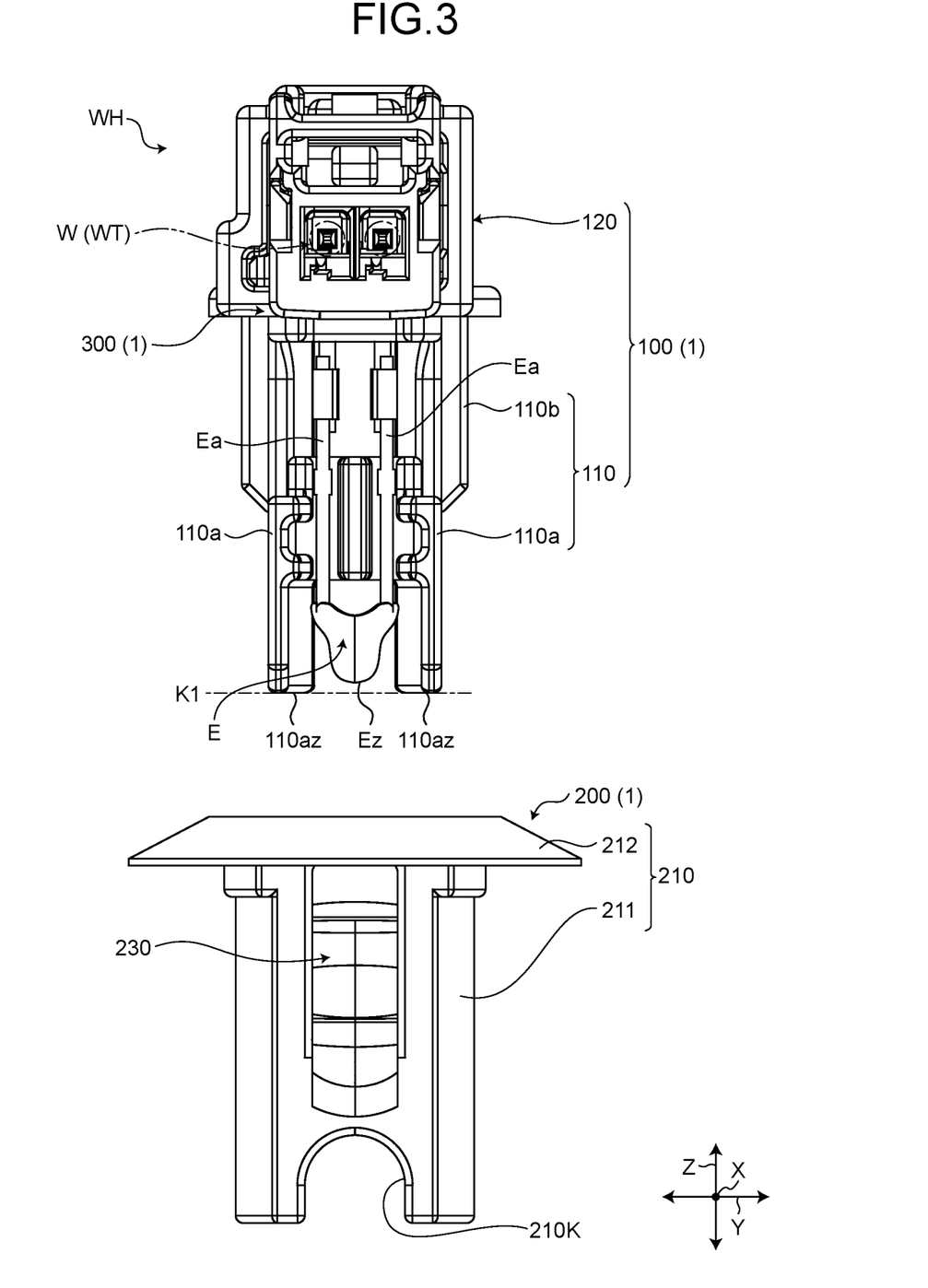
FIG. 3 is an exploded front view illustrating a schematic configuration of the wire harness including the temperature sensor according to the embodiment.

Furthermore, as illustrated in FIG. 2, FIG. 3, and FIG. 6, the holding part 110 is configured including a pair of wall parts 110a and a wall part 110b.

The pair of wall parts 110a are sidewalls parts that extend along the depth direction X and the height direction Z with the width direction Y being the thickness direction. The wall parts 110a are positioned opposing to each other with a space provided therebetween along the width direction Y, and are positioned by sandwiching a window part 210K provided to the clamp part 200 in a state of being inserted into the clamp part 200. Note that the configuration of the window part 210K will be described later.

On the other hand, the wall part 110b is a sidewall part that extends along the width direction Y and the height direction Z with the depth direction X being the thickness direction. The wall part 110b has both end parts in the width direction Y connected to the ends of each of the wall parts 110a on the base end side in the depth direction X, and it is positioned in the window part 210K provided to the clamp part 200 in a state of being inserted into the clamp part 200.

Note that each of the wall parts 110a is set such that the length in the height direction Z is longer than the temperature-sensitive element E in a state where the holding part 110 is holding the temperature-sensitive element E, and it is formed such that a position K1 (see FIG. 3 and FIG. 6) of an end part 110az on the lower side in the height direction Z (that is, the tip side of the insertion direction Z1) is lower than the position of an end part Ez of the temperature-sensitive element E on the lower side in the height direction Z and positioned by protruding toward the lower side in the height direction Z. Furthermore, the wall part 110b is set such that the length in the height direction Z is shorter than the temperature-sensitive element E in a state where the holding part 110 is holding the temperature-sensitive element E, and it is formed such that the position of the end part on the lower side in the height direction Z is higher than the position of the temperature-sensitive element E.

Therefore, the holding part 110 has a U-shaped cross-section orthogonal to the height direction Z, and the temperature-sensitive element E can be housed in an internal space 110S with the tip side in the depth direction X being opened. The holding part 110 can also hold the temperature-sensitive element E in an exposed state along the depth direction X.

Figure 5:
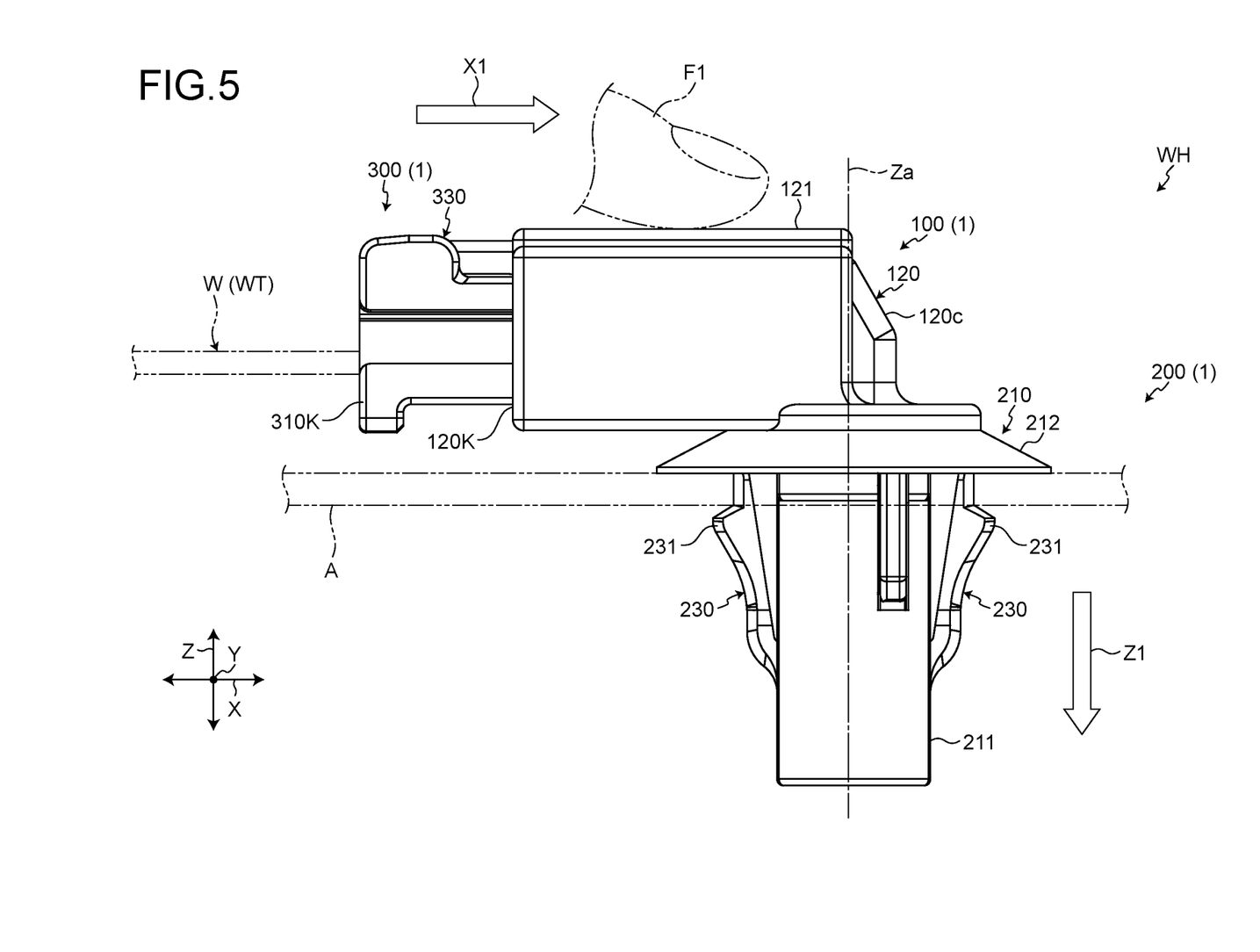
FIG. 5 is a side view illustrating a schematic configuration of the wire harness including the temperature sensor according to the first embodiment.

The connector part 120 is a part that, in a state of being fixed to the fixing target area A via the clamp part 200, is positioned on the outer side of the fixed target area A, and extends from the holding part 110 along the fitting direction X1 that intersects with (is orthogonal to) the insertion direction Z1 to allow the connector 300 to be fitted along the fitting direction X1. As illustrated in FIG. 2, FIG. 5, and FIG. 6, the connector part 120 is configured including a pair of wall parts 120a, a pair of wall parts 120b, and a wall part 120c, and each of the parts is formed integrally. Each of the wall parts 120a is a sidewall part that extends along the fitting direction X1 and the height direction Z with the width direction Y being the thickness direction, and the wall parts 120a are positioned by opposing to each other with a space provided therebetween along the width direction Y. Furthermore, each of the wall parts 120b is a top wall part or a bottom wall part that extends along the fitting direction X1 and the width direction Y with the height direction Z being the thickness direction, and the wall parts 120b are positioned by opposing to each other with a space provided therebetween along the height direction Z. Furthermore, the wall part 120c is an end wall part that extends along the width direction Y and the height direction Z with the fitting direction X1 being the thickness direction, and both end parts in the width direction Y are connected to the end parts of the wall parts 120a positioned on the base end side in the fitting direction X1, respectively, while both end parts thereof in the height direction Z are connected to the end parts of the wall parts 120b positioned on the base end side in the fitting direction X1, respectively. Therefore, the connector part 120 is formed in a rectangular box shape, and capable of housing the connector 300 in an internal space 120S by inserting the connector 300 through an opening part 120K positioned on the tip side in the fitting direction X1.

Furthermore, as illustrated in FIG. 1, FIG. 2, FIG. 4, and FIG. 6, the main body part 100 is configured including a locking part 130 formed in the connector part 120.

The locking part 130 is a part that locks the connector part 120 at a prescribed position (L2 indicated in FIG. 6) in a state where the main body part 100 is being fitted to the connector 300. As illustrated in FIG. 2, the locking part 130 is a frame part that is provided in a top wall outer face 120b1 of the wall part 120b positioned on the upper side in the height direction Z, and it is formed by a slit extending from the base end side toward the tip side in the fitting direction X1.

Furthermore, as illustrated in FIG. 2, FIG. 3, and FIG. 6, the main body part 100 holds a terminal ET extending from the temperature-sensitive element E. The terminal ET is, for example, an L-shaped terminal configured with a conductive metallic material, and it is connected to the terminal T of the connector 300 when the connector 300 is fitted to the main body part 100. The main body part 100 holds the terminal ET with one end of the terminal ET being exposed to the internal space 110S and the other end of the terminal ET being exposed to the internal space 120S, and it is insert-molded with the terminal ET, for example. At this time, a lead terminal Ea extending from the temperature-sensitive element E is connected to a part of the terminal ET exposed in the internal space 110S by welding or the like, while the terminal T of the connector 300 is connected to a part of the terminal ET exposed in the internal space 120S. The temperature sensor 1 can electrically connect the temperature-sensitive element E and the wiring material W by physically and electrically connecting the terminal ET on the temperature-sensitive element E side and the terminal T on the wiring material W side in the internal space 120S. Note that the shape of the terminal ET is not specifically limited and can be changed as necessary in accordance with the shape of the main body part 100.

Furthermore, as illustrated in FIG. 1, FIG. 2, FIG. 5, and FIG. 6, the main body part 100 is configured including a pressure plane part 121 formed in the connector part 120. The pressure plane part 121 is a part that can press the outer face of the connector part 120 along the insertion direction Z1 when fixing the clamp part 200 to the fixing target area A. The pressure plane part 121 is positioned by partially overlapping with the clamp part 200 when viewed from the insertion direction Z1, and it is formed in the top wall outer face 120b1 of the wall part (top wall part) 120b positioned on the front side of the insertion direction Z1 (upper side of the height direction Z). The wall part 120b extends along the XY direction, and the base end side thereof overlaps with the clamp part 200 in the fitting direction X1. Therefore, when the wall part 120b is pressed, the main body part 100 can efficiently transmit the force to each of the parts of the clamp part 200.

As illustrated in FIG. 1 to FIG. 6, the clamp part 200 is configured including a shaft part 210, a positioning part 220 (see FIG. 6), and a pair of fixing parts 230, and each of those parts is integrally formed with an insulating resin material.

The shaft part 210 is configured including a housing part 211 and a hat part 212. The housing part 211 is a wall part that extends along the height direction Z and is formed in a cylindrical shape. The housing part 211 is in a size (diameter) that can be inserted into the insertion hole Ah of the fixing target area A, and its length along the height direction Z is formed to be longer than the thickness of the fixing target area A. On the other hand, the hat part 212 is a wall part extending from the housing part 211 radially, and it is formed at an end part of the housing part 211 on the upper side in the height direction Z. The hat part 212 is disposed at a position to cover the insertion hole Ah, in a state where the temperature sensor 1 is being fixed to the fixing target area A.

The positioning part 220 is a part that is supported by the housing part 211 in a cantilever-like shape and has a positioning claw part 221 formed at its tip part, thereby allowing the holding part 110 to be locked at a prescribed position L1 (see FIG. 6) when mounting the holding part 110 to the shaft part 210. The positioning part 220 is formed protruding from the inner face of the housing part 211 to the depth direction X, and extends from the lower side toward the upper side in the height direction Z. Furthermore, each of the positioning claw parts 221 is formed protruding inwardly in the depth direction X, and locks the wall part of the holding part 110, such as the wall part 110b or the like.

Note that the shaft part 210 can house the temperature-sensitive element E held by the holding part 110 together with the holding part 110, when the holding part 110 is locked by the positioning part 220.

Furthermore, the shaft part 210 is configured including a pair of window parts 210K formed along the depth direction X at the end part on the lower side in the height direction Z. Each of the window parts 210K is a part that allows the temperature-sensitive element E to be in contact with outside air (air flowing outside the shaft part 210) by exposing the temperature-sensitive element E held by the holding part 110 to outside (outside of the clamp part 200) in a state where the holding part 110 is being mounted to the shaft part 210 and locked at the prescribed position L1 by the positioning part 220. Air flowing through the fixing target area A comes into contact with the temperature-sensitive element E as it passes through the shaft part 210 along the depth direction X through the pair of window parts 210K. Therefore, the temperature-sensitive element E can efficiently detect the temperature of the air as a measurement target. While the shape of the window part 210K illustrated in FIG. 1 to FIG. 4 and the like is an arch shape, the shape thereof is not specifically limited as long as it is a structure that allows the temperature-sensitive element E to more easily come into contact with air, and it can be changed as necessary in accordance with the specifications of each part of the temperature-sensitive element E and the like.

The pair of fixing parts 230 are parts that are supported by the housing part 211 in a cantilever-like shape and have fixing claws 231 formed at the tip parts, respectively, capable of fixing the main body part 100 to the fixing target area A when the clamp part 200 is inserted into the insertion hole Ah. As illustrated in FIG. 6, the pair of fixing parts 230 are formed protruding from the outer face of the housing part 211 to the depth direction X. Furthermore, the fixing parts 230 are formed at positions opposing to each other with the housing part 211 interposed therebetween with respect to the depth direction X, and extend from the lower side to the upper side in the height direction Z. Moreover, each of the fixing claws 231 is formed protruding outwardly in the depth direction X, and locked to the edge of the insertion hole Ah when the clamp part 200 is inserted into the insertion hole Ah. The pair of fixing parts 230 have flexibility and are formed such that each of the fixing parts 230 is capable of being inserted into the insertion hole Ah while being bent, and each of the fixing claws 231 is locked at the edge of the insertion hole Ah, whereby the clamp part 200 can fix the temperature sensor 1 to the fixing target area A because.

As illustrated in FIG. 1, FIG. 2, and FIG. 6, the connector 300 is configured including a plurality of terminal housing parts 310, a locked part 320 that is locked to the main body part 100, and a locking release operation part 330, and each of those parts is integrally formed with an insulating resin material.

Figure 4:
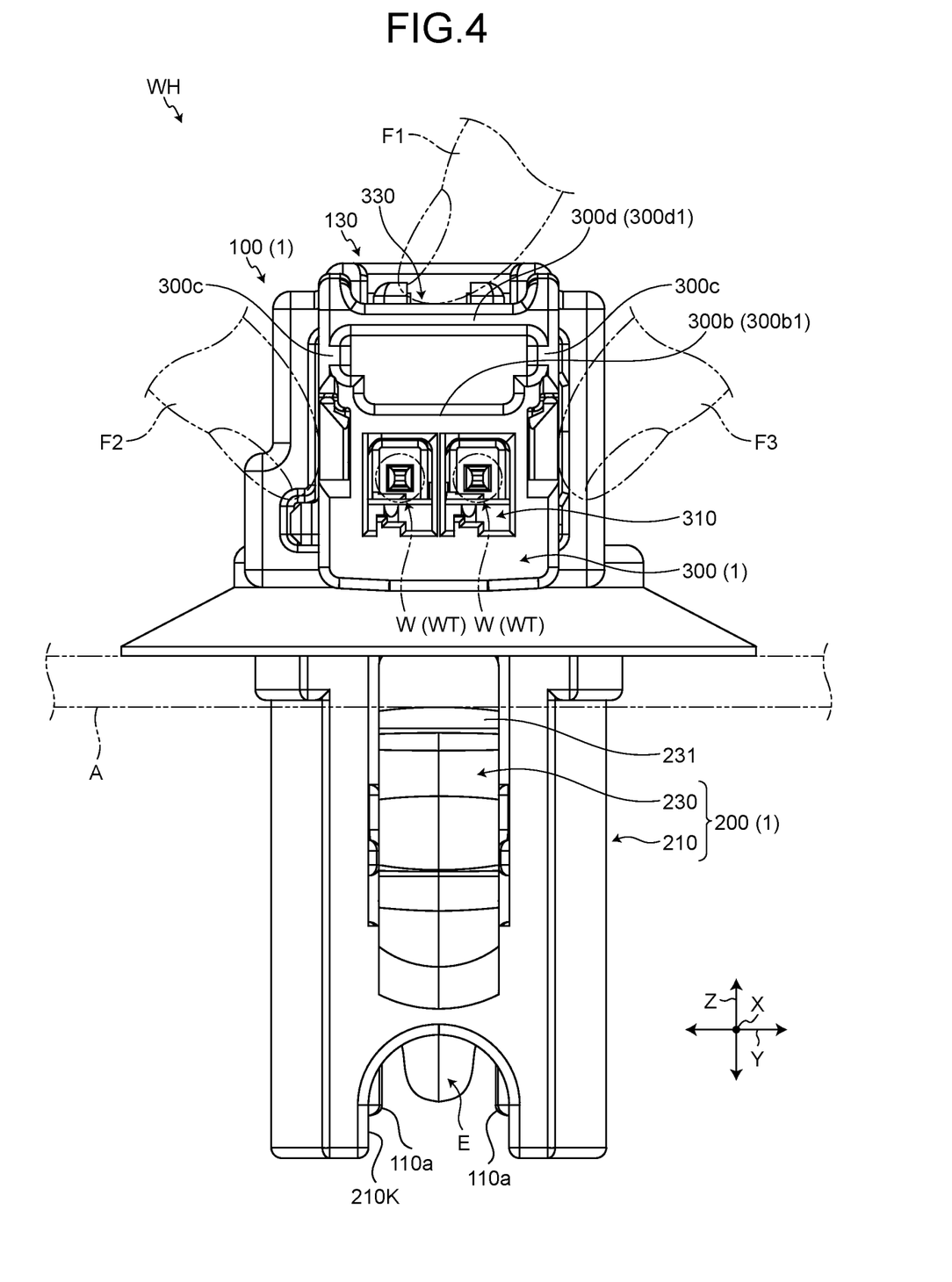
FIG. 4 is a front view illustrating a schematic configuration of the wire harness including the temperature sensor according to a first embodiment.

The terminal housing part 310 is a part that can house the terminal T of the wiring material W when the wiring material WT with terminal is mounted. As illustrated in FIG. 1, FIG. 2, and FIG. 4, two terminal housing parts 310 are provided, and each of the terminal housing parts 310 is positioned with a space provided therebetween along the width direction Y in a state where the connector 300 is being fitted to the connector part 120.

As illustrated in FIG. 1, FIG. 2, and FIG. 4, the connector 300 is configured including a housing formed with a plurality of wall parts (sidewall parts) 300a and a plurality of wall parts (a top wall part and a bottom wall part) 300b, and a plurality of terminal housing parts 310 are formed in the housing. Each of the terminal housing parts 310 is formed (sectioned) by the wall parts 300a and the wall parts 300b configuring the housing. More specifically, each of the wall parts 300a is a wall part that extends along the height direction Z and the fitting direction X1 that is aligned with the depth direction X with the width direction Y being the thickness direction, and is positioned by opposing to each other with a space provided therebetween along the width direction Y. Furthermore, each of the wall parts 300b is a wall part that extends along the fitting direction X1 and the width direction Y with the height direction Z being the thickness direction, and is positioned opposing to each other with a space provided therebetween along the height direction Z. With such configurations, each of the terminal housing parts 310 is formed in a rectangular cylindrical shape, and the terminal T can be inserted and housed therein through an insertion port 310K (see FIG. 5) positioned on the tip side (base end side of the connector 300) in the fitting direction X1. Furthermore, each of the terminal housing parts 310 can lock the terminal T by a lance 310a and a retainer 310b disposed inside thereof (see FIG. 6).

The lance 310a is a member that is disposed on the base end side of each of the terminal housing parts 310 in the fitting direction X1. When the terminal T is inserted through the insertion port 310K, the lance 310a elastically deforms in a direction that intersects with the fitting direction X1 (inward side in the height direction Z) to be fitted to the terminal T, thereby making it possible to hold the terminal T at a prescribed position (housing completed position) inside each of the terminal housing parts 310. On the other hand, the retainer 310b is a member that is disposed on the tip side of each of the terminal housing parts 310 in the fitting direction X1, and it can properly lock the terminal to the terminal housing part 310 by suppressing positional misalignment of the terminal T to be housed in each of the terminal housing parts 310.

The locked part 320 is a part that is locked to the locking part 130 of the main body part 100 at the prescribed position L2 (see FIG. 6), in a state where the connector 300 is being fitted to the main body part 100. As illustrated in FIG. 2, the connector 300 is configured including a flexible part that is formed by a pair of support parts 300c erected from a top wall outer face 300b1 of the wall part 300b positioned on the upper side of the height direction Z and a deformation part 300d that extends along the extending direction of the wall part 300b and has both end parts connected to each of the support parts 300c. The locked part 320 is formed in the deformation part 300d of the flexible part, and extends from the tip side toward the base end side in the fitting direction X1. Furthermore, a locked claw 321 is formed at the tip of the locked part 320, that is, on the base end side of the fitting direction X1, and the locked claw 321 is formed protruding outwardly in the height direction Z.

The locking release operation part 330 is a part capable of releasing a locking relation between the locked part 320 and the locking part 130. The locking release operation part 330 is configured with the flexible part described above including the pair of support parts 300c and the deformation part 300d, which is formed on the tip side (insertion port 310K side) of the deformation part 300d in the fitting direction X1. Therefore, the locking release operation part 330 elastically deforms the pair of support parts 300c inwardly in the height direction Z together with the deformation part 300d when a deformation part outer face 300d1 of the deformation part 300d positioned on the front side of the insertion direction Z1 along the extending direction XY of the fixing target area A is pressed along the insertion direction Z1, in a state where the connector 300 is being fitted to the main body part 100.

Next, an operation of the wire harness WH will be described.

First, an operator prepares the main body part 100, the clamp part 200, and the connector 300 of the temperature sensor 1. Although each of the parts of the temperature sensor 1 is transported to an installation site in an unassembled state, the holding part 110 of the main body part 100 can prevent external forces from being applied to the temperature-sensitive element E by the pair of wall parts 110a positioned by sandwiching the temperature-sensitive element E. Therefore, the main body part 100 can properly protect the temperature-sensitive element E.

Then, the operator mounts the main body part 100 to the clamp part 200. At this time, the holding part 110 of the main body part 100 is inserted into the housing part 211 from the insertion hole 200h of the clamp part 200 along the insertion direction Z1. The end part Ez on the tip side of the holding part 110 in the insertion direction Z1 is positioned by protruding more to the tip side in the insertion direction Z1 than the end part 110az of the temperature-sensitive element E on the tip side in the insertion direction Z1 does. Therefore, when the main body part 100 is inserted inside the clamp part 200, it is possible to prevent the temperature-sensitive element E positioned on the inner side (upper side in the height direction Z) than the end part Ez of the holding part 110 from contacting each of the parts of the clamp part 200 and possible to prevent external forces from being applied to the temperature-sensitive element E. Furthermore, the holding part 110 is locked at the prescribed position L1 by the positioning part 220. Therefore, the temperature-sensitive element E held by the holding part 110 is housed in the housing part 211 of the clamp part 200 and fixed at a position exposed through each of the window parts 210K formed in the housing part 211.

The operator then prepares the wiring materials WT with terminal, and houses each of the terminals T of the wiring materials WT with terminal in each of the terminal housing parts 310 formed in the connector 300. At this time, each of the terminals T is inserted through the insertion port 310K of each of the terminal housing parts 310, and fixed by the lance 310a and the retainer 310b disposed inside each of the terminal housing parts 310.

The operator then fits the connector 300 to the main body part 100 by fitting the tip of the connector 300 connected to the end part of the wiring material WT with terminal into the internal space 120S from the opening part 120K of the connector part 120. At this time, the locked part 320 of the connector 300 is locked at the prescribed position L2 by the locking part 130 of the main body part 100. Furthermore, while maintaining the locked state between the connector 300 and the main body part 100, the terminal T on the connector 300 side and the terminal ET on the main body part 100 side are physically and electrically connected, and the wiring material W and the temperature-sensitive element E are electrically connected.

Then, in a state where the housing part 211 of the clamp part 200 is being inserted into the insertion hole Ah, the operator fixes the temperature sensor 1 to which the wiring material WT with terminal is mounted, that is, the wire harness WH, to the fixing target area A by pressing the pressure plane part 121 along the insertion direction Z1. At this time, the pressure plane part 121 is positioned on the front side of the insertion direction Z1. Therefore, the operator can press the pressure plane part 121 with a single finger F1, for example, to fix the wire harness WH to the fixing target area A by a simple operation method. Furthermore, the pressure plane part 121 is formed at a position partially overlapping with the clamp part 200 when viewed from the height direction Z. Thus, the operator can press a position close to an axial center Za of the clamp part 200, and the main body part 100 can efficiently transmit the external force applied to the pressure plane part 121 to the clamp part 200. Therefore, the operator can fix the wire harness WH to the fixing target are A with less force.

Furthermore, in a state where the wire harness WH is being fixed to the fixing target area A, the connector part 120 of the main body part 100 and the connector 300 are disposed along the fitting direction X1 that intersects with (orthogonal to) the insertion direction Z1, with the connector part 120 and the connector 300 being disposed adjacent to the fixing target area A, as illustrated in FIG. 5. Therefore, with the wire harness WH, it is possible to route the wiring material W extending from the connector 300 along the fixing target area A and to suppress the amount of protrusion (length in the height direction Z) from the fixing target area A.

The operator then removes the connector 300 from the main body part 100 fixed to the fixing target area A by pressing the locking release operation part 330 of the connector 300 as necessary, during maintenance work or replacement work of the temperature-sensitive element E. At this time, the locking release operation part 330 is provided on the insertion port 310K side. Therefore, as illustrated in FIG. 4, the operator can release the locking relation between the locked part 320 and the locking part 130 by, for example, pressing the locking release operation part 330 with the finger F1 and elastically deforming the locked part 320 inwardly in the height direction Z. Furthermore, the operator can remove the connector 300 from the main body part 100 by pinching the end part of the connector 300 on the insertion port 310K side with two fingers F2 and F3 from the width direction Y side in a state where the locking relation between the locked part 320 and the locking part 130 is released.

The wire harness WH to which the temperature sensor 1 described above is applied includes: the temperature-sensitive element E that detects the temperature of a measurement target; the main body part 100 that holds the temperature-sensitive element E; the clamp part 200 that is capable of being attached to and detached from the fixing target area A along the insertion direction Z1 (a first direction) and capable of fixing the main body part 100 to the fixing target part A in a state of being mounted to the fixing target area A; and the connector 300 that is provided at an end part of the wiring material W exhibiting conductivity, and the temperature-sensitive element E and the wiring material W are electrically connected in a state of being fitted to the main body part 100. Furthermore, the main body part 100 includes the holding part 110 extending along the insertion direction Z1 (insertion direction along the first direction), which holds the temperature-sensitive element E on the tip side in the insertion direction Z1 and is positioned inside the clamp part 200 by being inserted inside the clamp part 200 along the insertion direction Z1; and the connector part 120 capable of allowing the connector 300 to be fitted thereto in a state of being fixed to the fixing target area A via the clamp part 200. The clamp part 200 includes, in a state of being mounted to the fixing target area A, the pair of window parts 210K for exposing the temperature-sensitive element E held by the holding part 110 to outside of the clamp part 200, which are provided at end parts positioned inside the fixing target area A and formed along a direction intersecting with the insertion direction Z1. Furthermore, the holding part 110 includes the pair of wall parts 110a (protection wall parts) positioned by sandwiching the window part 210K in a state of being inserted inside the clamp part 200, and the end part 110az of the wall part 110a on the tip side in the insertion direction Z1 is positioned by protruding more toward the tip side than the end part Ez of the temperature-sensitive element E on the tip side does.

With such a configuration, the temperature sensor 1 can prevent external forces from being applied to the temperature-sensitive element E during transportation and assembling operations by the pair of wall parts 110a that are provided in the holding part 110 of the main body part 100 and positioned by sandwiching the temperature-sensitive element E. Furthermore, the temperature sensor 1 has the end part 110az of the wall part 110a positioned by protruding more toward the tip side in the insertion direction Z1 than the end part Ez of the temperature-sensitive element E does, thereby making it possible to prevent the end part Ez of the temperature-sensitive element E from contacting each part of the clamp part 200 and to prevent the external forces from being applied to the temperature-sensitive element E when the main body part 100 is inserted inside the clamp part 200 along the insertion direction Z1. Therefore, the temperature sensor 1 and the wire harness WH can properly protect the temperature-sensitive element E.

Note that the temperature sensor 1 and the wire harness WH according to the embodiment of the present invention described above are not limited to the embodiment described above, and various changes are possible within the scope of the appended claims.

For example, while the direction in which the connector is fitted to the main body part is described as the direction along the depth direction X that is orthogonal to the height direction Z, it is not limited thereto. The direction in which the connector is fitted to the main body part may be in a direction that intersects with the depth direction X when viewed from the width direction Y or may be a direction along the height direction Z.

Furthermore, while the fixing target area A is described as a structure of an air duct on the intake side, it is not limited thereto. The fixing target area A may also be a structure other than an air duct of a vehicle.

The temperature sensor and the wire harness according to the present embodiment may be configured by combining the structural components of the embodiment described above and modification examples as appropriate.

The temperature sensor and the wire harness according to the present embodiment can properly protect the temperature-sensitive element.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A temperature sensor comprising:
a temperature-sensitive element that detects a temperature of a measurement target;
a main body part that holds the temperature-sensitive element;
a clamp part that is capable of being attached to and detached from a fixing target area along a first direction and capable of fixing the main body part to the fixing target area in a state of being mounted to the fixing target area; and
a connector that is provided at an end part of a wiring material exhibiting conductivity and allows, in a state of being fitted to the main body part, the temperature-sensitive element and the wiring material to be electrically connected, wherein
the main body part includes:
a holding part that extends along an insertion direction aligned with the first direction, the holding part holding the temperature-sensitive element on a tip side in the insertion direction and being positioned inside the clamp part by being inserted inside the clamp part along the insertion direction; and
a connector part to which the connector is capable of being fitted in a state of being fixed to the fixing target area via the clamp part,
the clamp part includes, in a state of being mounted to the fixing target area, a pair of window parts for exposing the temperature-sensitive element held by the holding part to outside of the clamp part, the pair of window parts being provided at end parts positioned inside the fixing target area and being formed along a direction intersecting with the first direction, the holding part includes a pair of protection wall parts positioned by sandwiching the window parts in a state of being inserted inside the clamp part, and an end part of the protection wall part on a tip side in the insertion direction is positioned by protruding more to the tip side than an end part of the temperature-sensitive element on the tip side does.

2. A wire harness comprising:

a wiring material exhibiting conductivity; and a temperature sensor that includes: a temperature-sensitive element that detects a temperature of a measurement target; a main body part that holds the temperature-sensitive element; a clamp part that is capable of being attached to and detached from a fixing target area along a first direction and capable of fixing the main body part to the fixing target area in a state of being mounted to the fixing target area; and a connector that is provided at an end part of a wiring material exhibiting conductivity and allows, in a state of being fitted to the main body part, the temperature-sensitive element and the wiring material to be electrically connected, wherein the main body part includes:

a holding part that extends along an insertion direction aligned with the first direction, the holding part holding the temperature-sensitive element on a tip side in the insertion direction and being positioned inside the clamp part by being inserted inside the clamp part along the insertion direction; and a connector part to which the connector is capable of being fitted in a state of being fixed to the fixing target area via the clamp part, the clamp part includes, in a state of being mounted to the fixing target area, a pair of window parts for exposing the temperature-sensitive element held by the holding part to outside of the clamp part, the pair of window parts being provided at end parts positioned inside the fixing target area and being formed along a direction intersecting with the first direction, the holding part includes a pair of protection wall parts positioned by sandwiching the window parts in a state of being inserted inside the clamp part, and an end part of the protection wall part on a tip side in the insertion direction is positioned by protruding more to the tip side than an end part of the temperature-sensitive element on the tip side does.

\* \* \* \* \*